United States Patent [19]

Caesar

[11] Patent Number: 5,434,554
[45] Date of Patent: Jul. 18, 1995

[54] METHOD AND APPARATUS FOR WARNING MOTORIST

[76] Inventor: Moses Caesar, P.O. Box 22987, Fort Worth, Tex. 76122

[21] Appl. No.: 299,321

[22] Filed: Aug. 31, 1994

Related U.S. Application Data

[63] Continuation of Ser. No. 685,294, Apr. 11, 1991, abandoned.

[51] Int. Cl.⁶ .................................................. B60Q 1/26
[52] U.S. Cl. ..................................... 340/468; 340/467; 340/479
[58] Field of Search ........................ 340/467, 468, 479

[56] References Cited

U.S. PATENT DOCUMENTS

| | | | |
|---|---|---|---|
| 3,846,749 | 11/1974 | Curry | 340/479 |
| 3,911,394 | 10/1975 | Shames | 340/467 |
| 4,231,013 | 10/1980 | Freeman et al. | 340/479 |
| 4,772,868 | 9/1988 | Chen | 340/467 |
| 4,990,887 | 2/1991 | Lee | 340/463 |

Primary Examiner—John K. Peng
Assistant Examiner—Edward Lefkowitz
Attorney, Agent, or Firm—Melvin A. Hunn

[57] ABSTRACT

A warning light system is provided for use in a motor vehicle having a cab region for accommodating a vehicle driver, and a brake light system including a voltage source and an electrically actuated lamp disposed at the rear of the vehicle. The warning light system provides a warning system to motorists rearward of the vehicle. The motorists have on average a reaction time above a reaction time threshold. The warning light system in the present invention exposes motorists rearward of the vehicle to at least one flash of the electrically actuated lamp of the vehicle brake light system. Each of the flashes have a duration less than the average reaction time threshold of motorists. In an alternative embodiment, the warning light system of the present invention may be coupled to an electrically actuated lamp which is mounted rearward on the vehicle, and is independent of the vehicle brake light system.

10 Claims, 8 Drawing Sheets

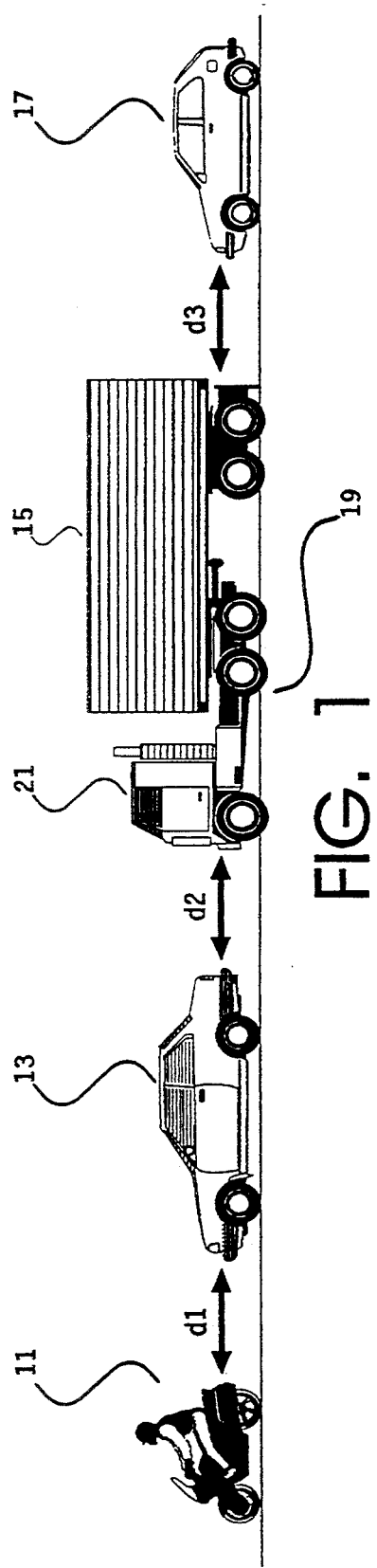
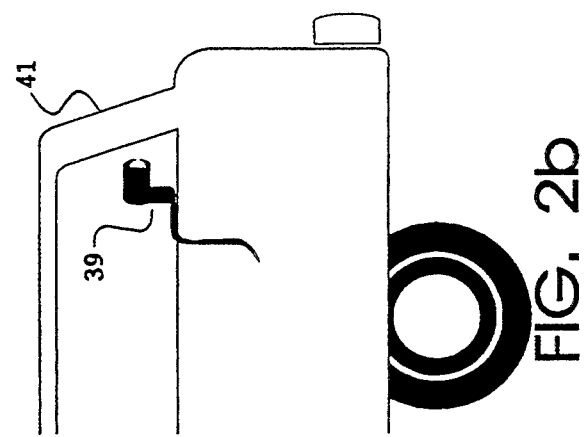
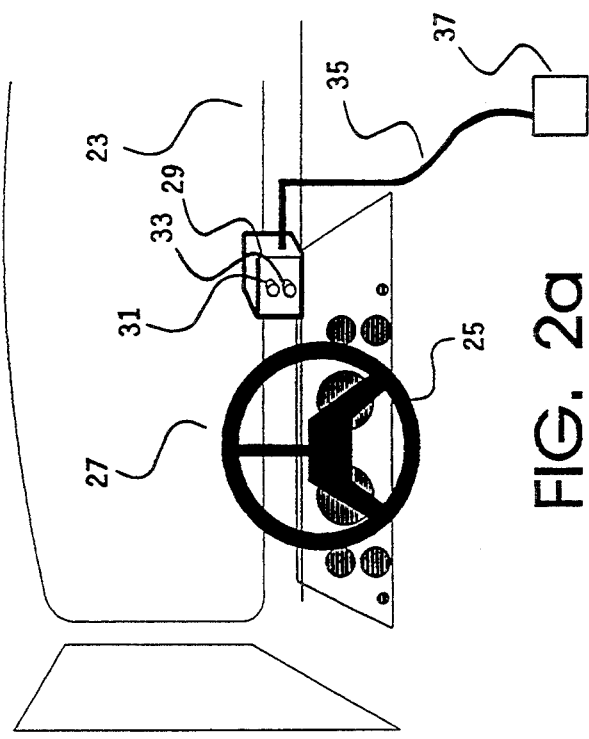

Normal probability plot of total perception-responce times for young subjects.

Normal probability plot of total perception-response times for older subjects.

Normal probability plot of perception times for young subjects.

Normal probability plot of perception times for older subjects.

METHOD AND APPARATUS FOR WARNING MOTORIST

This is a continuation of application Ser. No. 07/685,294, filed Apr. 11, 1991, now abandoned.

BACKGROUND OF THE INVENTION

1. Field of the Invention

This invention relates generally to safety devices for use in vehicles, and generally to safety devices for use in vehicles which serve to send visual messages to adjoining vehicles.

2. Description of the Prior Art

A variety of warning and messaging systems are provided in automobiles and other vehicles for warning rearward vehicles. All vehicles are required to have a brake lighting system which serves to indicate to rearward motorists that a vehicle is slowing or stopping. Most vehicles also include warning light systems which flash hazard lights to indicate to other motorists that a vehicle is in distress, or parked. Hazard lights are particularly useful when a vehicle is disabled on a high-speed roadway. Hazard lights can also be used on slow-moving vehicles to increase safety in fast-moving traffic. They serve to minimize the possibility that oncoming traffic will collide with the parked or stopped vehicle. Most vehicles are also equipped with a turn signal lighting system which indicates that the vehicle is turning either right or left.

One frequently encountered problem in high-speed traffic is that of tailgating vehicles. It is not uncommon to find a whole series of vehicles traveling together at high speeds separated by only several "car lengths" of distance. This is a very dangerous traffic condition, since a sudden stop by one of the vehicles could result in a chain reaction accident.

The standard messaging systems described above are inadequate for use in high-speed, multi-car, closely-spaced traffic streams. If a driver becomes trapped in such a traffic stream, it is generally unsafe for him or her to actuate or even slightly tap the vehicle brakes, since this will only decrease the distance between the rear of his vehicle and the rearward vehicle. Furthermore, depressing the brake could give a false indication to the rearward vehicle or vehicles that a sudden stop may be required. This could cause one or more of the rearward vehicles to suddenly brake, causing a multi-car traffic accident. Actual removal of the driver's foot from the accelerator pedal, even if only to tap the vehicle brakes, would cause substantial and undesired loss of acceleration and velocity. Furthermore, the tapping of the vehicle brake pedal would cause an undesired loss of vehicle cruise control, if the cruise control function is in-fact being used. Additionally, depression of the brake could begin actual but unintended braking.

Actuating the vehicle hazard lights is equally inadequate in conveying a message to rearward vehicles that the trailing distance should be increased. The actuation of the vehicle hazard lights may convey a message to one or more rearward vehicles that an emergency condition exists, and may cause one or more of the rearward vehicles to suddenly brake, possibly causing a chain-reaction accident.

Finally, the vehicle turn signal indicator is also useless in conveying a message to surrounding vehicles that they are traveling too close. Use of the turn signals could cause confusion. It is also likely that use of the turn indicators could cause rearward motorists to increase speed to fill a space or "slot" that they believe is about to be surrendered.

SUMMARY OF THE INVENTION

It is one objective of the present invention to provide a warning light system for use in a motor vehicle for actuating an electrically actuated lamp disposed at the rear of the vehicle, for providing a warning signal to motorists rearward of the vehicle, but which is unlikely to result in a braking response from the rearward motorists.

It is another objective of the present invention to provide a warning light system for use in a motor vehicle to provide a warning signal to rearward motorists, a flash having a duration less than the average reaction time of motorists.

It is yet another objective of the present invention to provide a warning light system for use in providing a warning indication to rearward motorists, and which electrically couples to the vehicle brake light system.

These objectives are achieved as is now described. A warning light system is provided for use in a motor vehicle having a cab region for accommodating a vehicle driver, and a brake light system including a voltage source and an electrically actuated lamp disposed at the rear of the vehicle. The warning light system provides a warning system to motorists rearward of the vehicle. The motorists have on average a reaction time above a reaction time threshold. The warning light system includes a timer means for producing at least one timing pulse, each of which have a duration less than the reaction time threshold. An actuator means is provided and disposed within the vehicle cab region. The actuator means is electrically coupled to the timer means and is operable by the vehicle driver for actuating the timer means. A lamp switch is electrically coupled between the voltage source and the electrically actuated lamp of the brake light system. The lamp switch is responsive to the timer means for coupling the voltage source to the electrically actuated lamp. This completes an electrical circuit, causing the electrically actuated lamp of the brake system to be energized and flashed in a pattern corresponding to the timing pulse of the timer means. The warning light system in the present invention exposes motorists rearward of the vehicle to at least one flash of the electrically actuated lamp of the vehicle=-brake light system. Each of the flashes have a duration less than the average reaction time threshold of motorists. In an alternative embodiment, the warning light system of the present invention may be coupled to an electrically actuated lamp which is mounted rearward on the vehicle, and is independent of the vehicle brake light system.

The present invention can be used to communicate to other motorists, and is particularly useful to warn tailgating vehicles to back-off. However, it can also be used to indicate that a vehicle is slowing, or preparing to turn. In this mode, the present invention operates to simulate a slight tapping of the vehicle brakes, which is a recommended practice set forth in driver's education materials.

The above as well as additional objects, features, and advantages of the invention will become apparent in the following detailed description.

BRIEF DESCRIPTION OF THE DRAWING

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 1 is a perspective view of a plurality of motor vehicles traveling at a high speed, all of which are following the forward vehicle at an unsafe distance;

FIG. 2a is a fragmentary perspective view of the vehicle cab region, and depicts the actuator disposed within the vehicle on the vehicle dash;

FIG. 2b is a partial cross-section view of the rear window of a vehicle, with a electrically actuated lamp disposed adjacent the rear window of the vehicle;

DETAILED DESCRIPTION OF THE INVENTION

Numerous scientific studies have been conducted in the area of automotive safety and in particular in the area of safe traveling speeds and how to optimize warning systems such as signage to prevent accidents. The stopping sight distance is one important criteria in the design of roadways and the placement of signage. Stopping sight distance is defined as the minimum sight distance that will allow a vehicle traveling at or near the design speed to stop just before reaching an object in its path. It is one of the most fundamental elements controlling the geometric design of roads and streets.

The stopping sight distance is established by considering driver perception and response time, vehicle speed and braking characteristics, and road characteristics. In determining a model for stopping sight distance, two main components were recognized: the perception-response distance (also called brake-reaction distance), which is the driver perception-response time multiplied by the vehicle's initial speed, and the braking distance, which is based on the arithmetic mean deceleration of the braking vehicle from the assumed speed to a complete stop on a level surface.

Both of these factors are defined, investigated, and discussed in a publication of the Transportation Research Board of the National Research Counsel identified as National Cooperative Highway Research Program Report No. 270, entitled "Parameters Affecting Stopping Sight Distance." This report was issued in June of 1984 and was sponsored by the American Association of State Highway and Transportation Officials in cooperation with the Federal Highway Administration. It was authored by P. L. Olson, D. E. Cleveland, P. S. Fancher, L. P. Kostyniuk, and L. W. Schneider of the University of Michigan Transportation Research Institute at Ann Harbour, Mich. This government report is incorporated herein by reference as if fully set forth.

Figure 5:
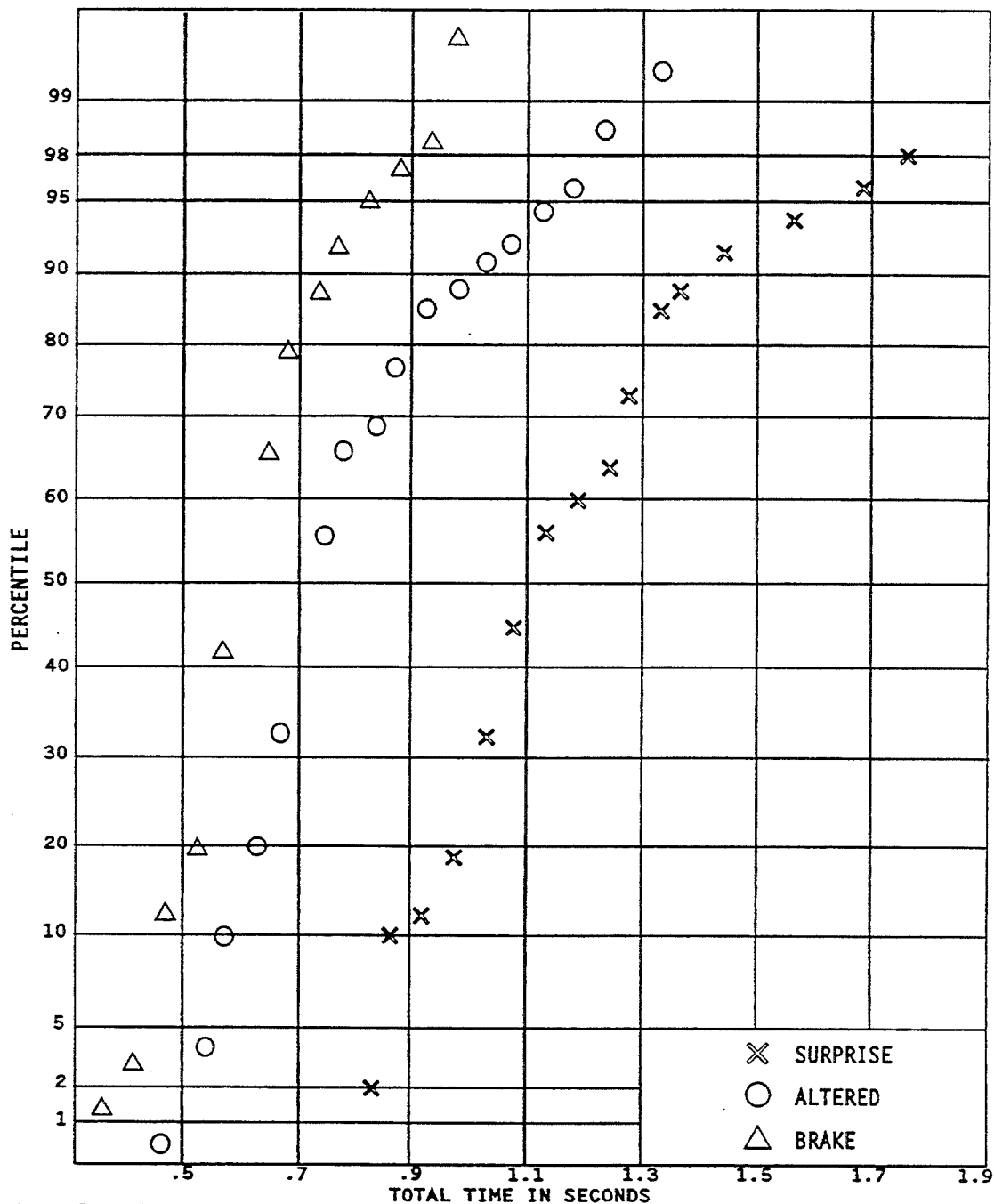
FIG. 5 is a normal probability plot of total perception-response time for young subjects, which was derived through experimentation.
Figure 6:
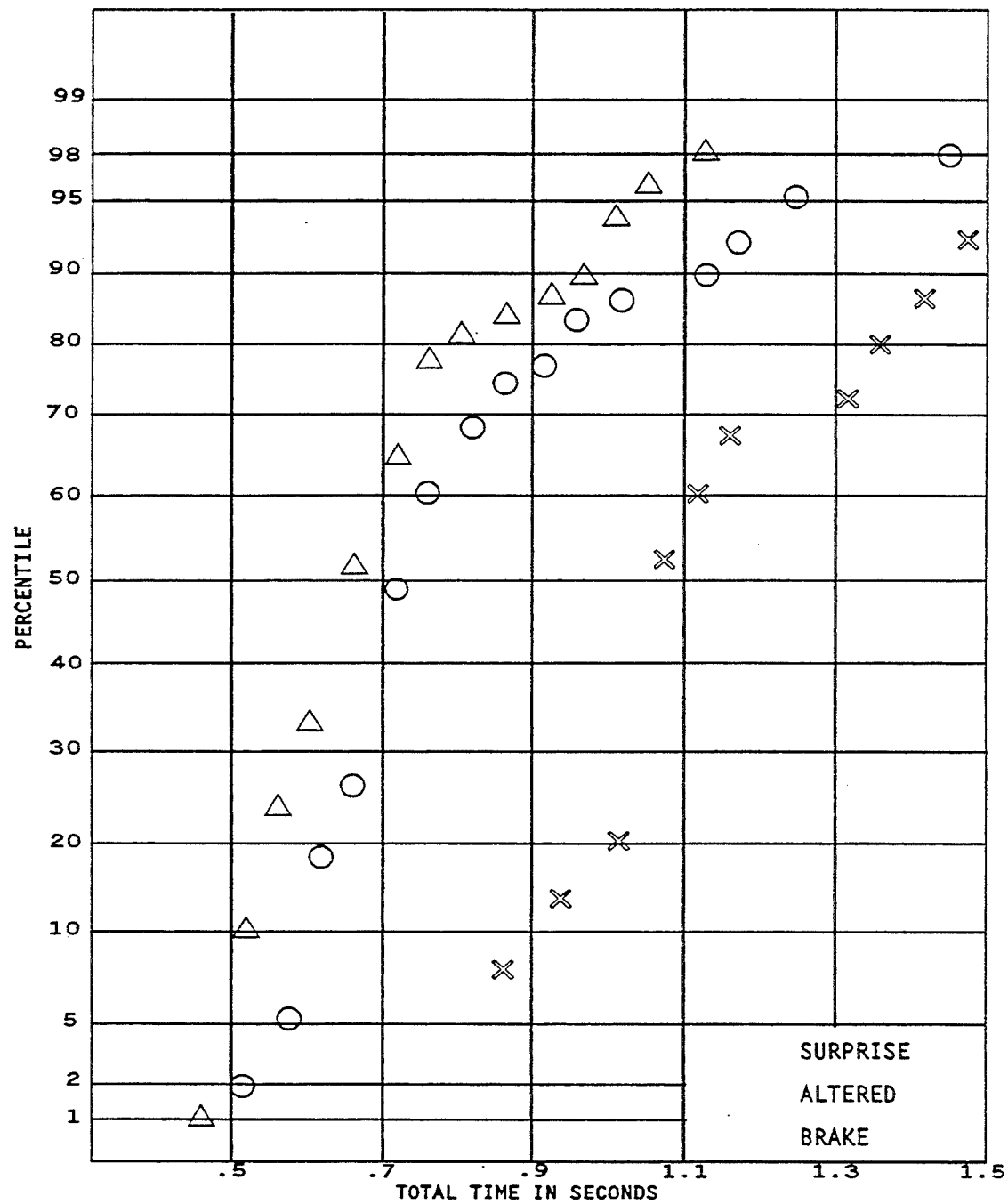
FIG. 6 is a normal probability plot of total perception-response times for older subjects, which was also derived from experimentation.

In this publication is included a lengthy report of a scientific study conducted to determine the driver perception-response time. The study includes a graph of the perception time for young subjects, and the total of perception and response times for young subjects. The report also includes similar data for older experimental subjects. FIG. 5 is a reproduction of the normal probability plot of the total perception-response time for young subjects. FIG. 6 is a copy of the normal probability plot of total perception-response times for older subjects.

The graphs of FIGS. 5 and 6 are of "total perception-response times" for both young and old subjects. This "total perception-response time" is the sum of the time from first visibility of an obstacle on the roadway until a response was initiated by the subject releasing the accelerator, and the time from the accelerator release until brake contact by the subject. These figures reveal that the young and old subjects in the experiment could react to obstacles in the road with approximately the same perception-response time.

Figure 7:
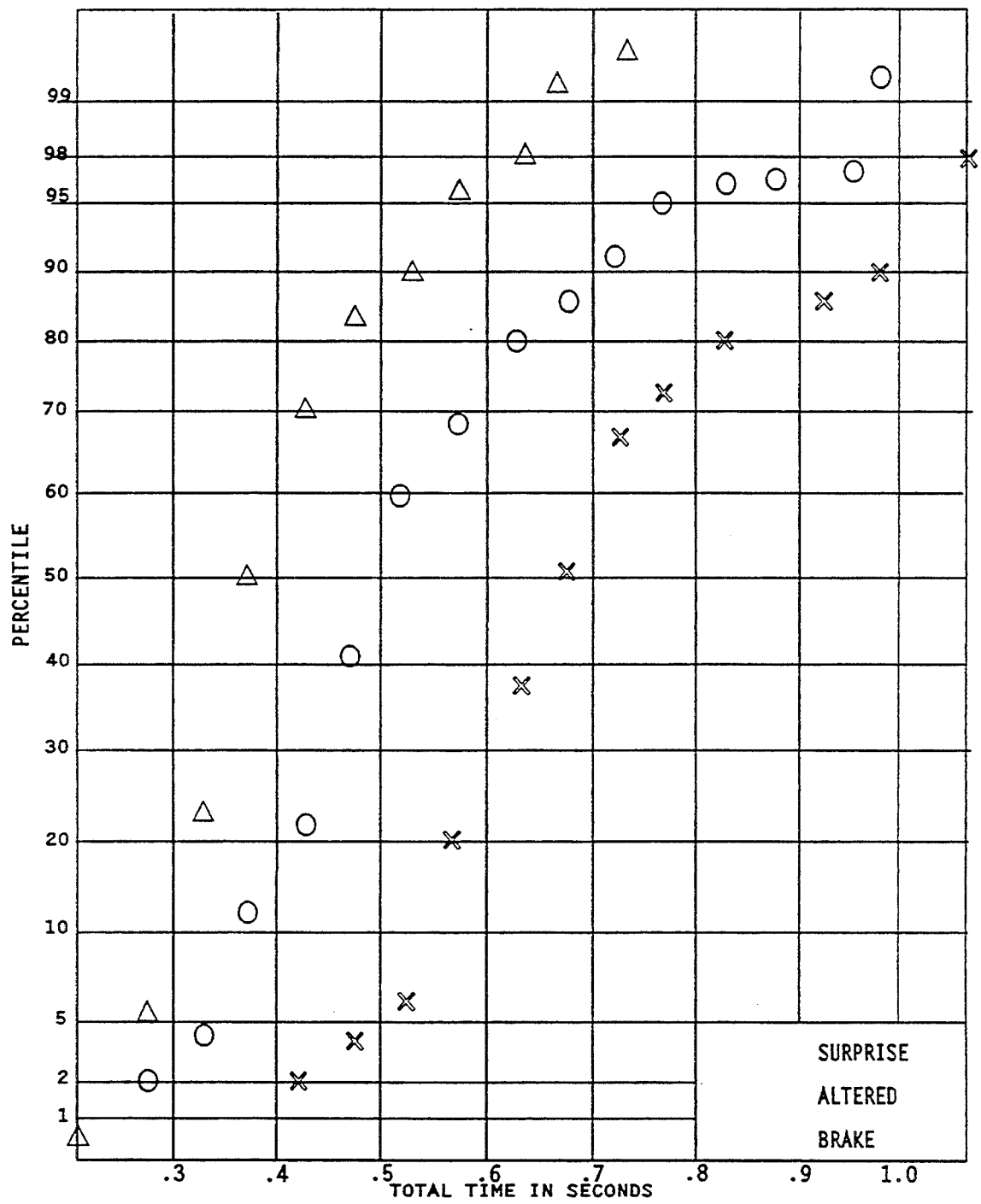
FIG. 7 is a normal probability plot of perception times only for young subjects, which was derived from experimentation.
Figure 8:
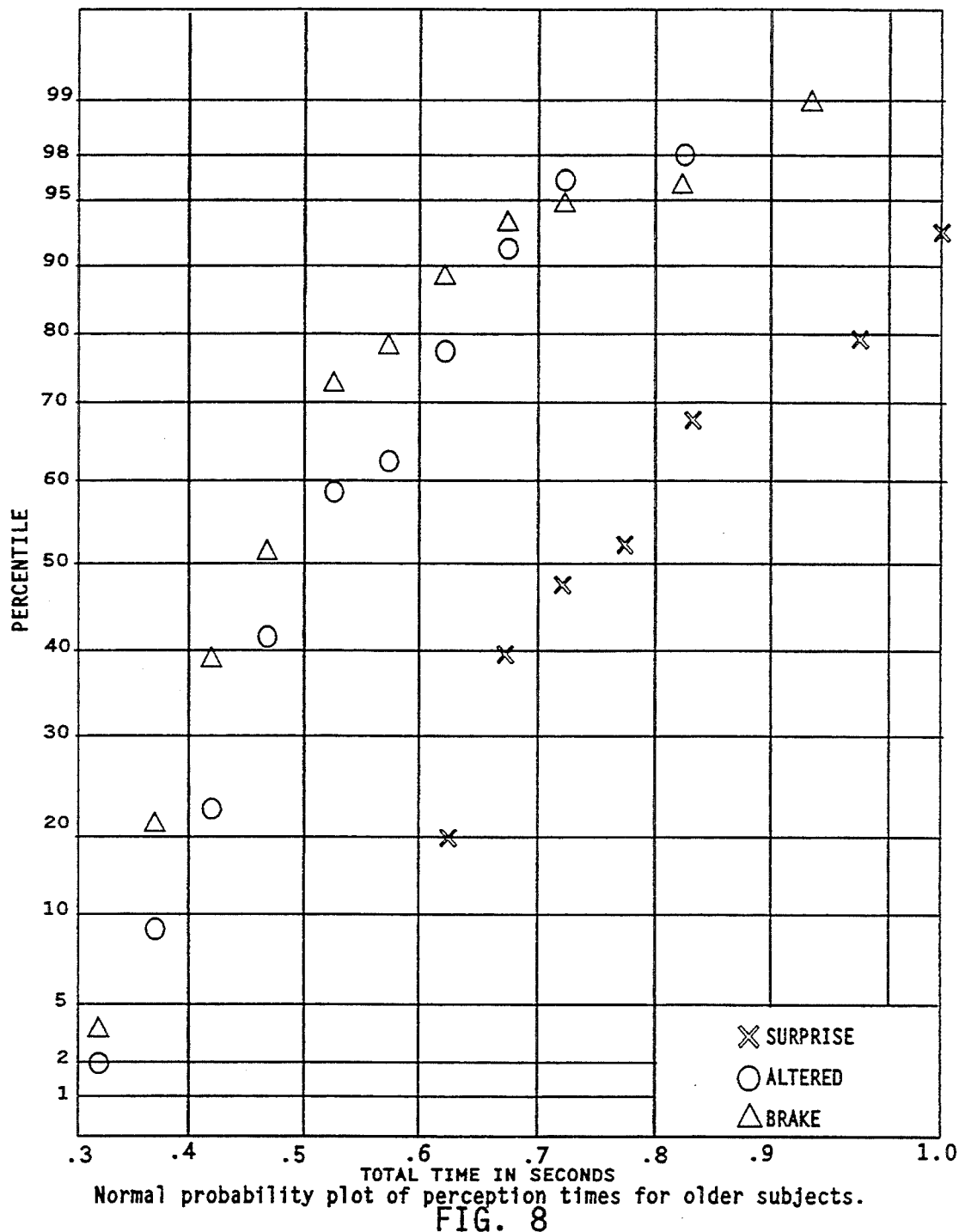
FIG. 8 is a normal probability plot of perception times only for older subjects, which was also derived from experimentation.

FIGS. 7 and 8 are reproductions of the normal probability plots of perception times only for young and old subjects. Perception time is defined as the time from the first sighting of an obstacle until the subject began to respond by lifting his or her foot from the accelerator.

It is clear from a comparison of FIGS. 5 through 8 that the time required to react to an obstacle in the road by braking differs significantly from the time required to perceive the obstacle in the road and release the accelerator pedal. The present invention is directed to a warning system which is designed to direct a message to rearward motorists that they are either following too close, or that the motorist ahead intends to brake or slow the vehicle. If the sufficiently long warning signal or series of signals is provided, the warning system of the present invention may cause one or more rearward motorists to release the acceleration pedal, but to not begin the braking process. This is important, since in high-speed, bumper-to-bumper traffic, the actual braking of one or more vehicles could present a serious risk of creating a chain-reaction accident.

Therefore, in the present invention, it is critical that any warning indication given to rearward motorists be of a duration of which is sufficient to cause one or more rearward motorists to either perceive a signal and not react or to decelerate slightly, but not begin braking.

For purposes of the present invention, and to maximize safety, it is safer to assume that high-speed motorists are in an alert state. Therefore, in FIGS. 7 and 8, the normal probability plot of "alerted" drivers is probably the best measure of the perception time. In FIGS. 7 and 8, "alerted" drivers were drivers who knew that some road obstacle could lie ahead in their path. Therefore, they reacted much more quickly than drivers who were not alerted, and thus "surprised" by the road obstacle.

As shown in FIGS. 7 and 8, ninety-nine percent (99%) of the young drivers, who were alerted to road obstacles, could brake within approximately 0.95 seconds. According to FIG. 8, ninety-eight percent (98%) of the older motorists could brake, when alerted, within approximately 0.8 seconds. Therefore, almost all the young and old drivers could perceive (and respond by removing his or her foot from the accelerator, but not braking) an obstacle within a time period between 0.8 and 0.95 seconds. This figure represents the slowest reaction time TM of "alerted" drivers. The quickest alerted young and old drivers could perceive a road obstacle (and respond by removing his or her foot from the accelerator, but not braking) in approximately 0.25 to 0.35 seconds.

Turning now to FIGS. 5 and 6, it can be seen that the quickest alerted young and old drivers could perceive and react by braking within a period of time between 0.45 and 0.55 seconds. The slowest alerted young and old drivers could perceive and respond to road obstacles within 1.3 to 1.5 seconds.

It is an objective of the present invention to provide a warning light system which minimizes the risk of rearward motorists unnecessarily braking, but maximizes the likelihood that rearward motorists will release the accelerator pedal, and decelerate slightly in response to the warning signal. To some extent, the exact duration of the warning signal is a matter of judgment and design choice, but the data represented in FIGS. 5 through e provide some general boundaries for the duration of the warning signal. It is probably most prudent to provide a warning signal which even the quickest young and old motorists would be able to perceive but, would not be of sufficient duration to cause them to brake. Extremely short flashes can be used if it is desired the rearward motorists only perceive the signal but not remove their foot from the accelerator.

With reference now to FIG. 1, traffic stream 21 is shown traveling on Highway 19. The stream of traffic includes motorcyclist 11, automobile 13, truck 15, and automobile 17. Motorcyclist 11 is separated from automobile 13 by an inadequate and unsafe distance d1. Automobile 13 is separated from truck 15 by an inadequate and unsafe distance d2. Truck 15 is separated from automobile 17 by an also inadequate and unsafe distance d3. The motorist in automobile 13 may realize that truck 15 is traveling at a very unsafe distance from his rear bumper.

If motorcyclist 11 were to have problems or loose control of his cycle, motorist in automobile 13 may not be able to avert the accident, and will certainly be subject to collision from the rear by truck 15 which would be unable to stop in distance d2 If motorist in vehicle 13 were to use his brake lights or warning lights to flash motorist in truck 15, this may cause the driver of truck 15 to quickly begin a rapid deceleration. The danger here is that motorist rearward of truck 15, including automobile 17, may not be able to stop in time to avert collision with the rear of truck 15. Therefore, use of the brake or is in warning lights fact counterproductive and dangerous.

The present invention discloses a warning light system which allows the operator of automobile 13 to provide a warning flash which has a duration less than the average reaction time threshold of the rearward motorists. This would result in the driver of truck 15 releasing his accelerator pedal, but not braking truck 15.

In FIG. 2a, the cab region 23 is disclosed in partial fragmentary view. Steering wheel 25 is disposed at dashboard 27. Actuator housing 29 is disposed on dash 27, and includes an actuator button 33, and a indicator 31. Alternately, the actuator can be mounted on the steering wheel 25 or the vehicle floorboard. Actuator button 33 may be used by the operator of vehicle 13 to produce a warning flash at the rear of vehicle 13 which is within the field of view of rearward motorists. Warning indicator 31 may be an electrically actuated light or a tone generator which confirms to the operator of vehicle 13 that the warning flashes have indeed been generated and presented to rearward motorists.

Actuator button 33 is electrically coupled to electrical housing 37 through electrical conductor electrical housing 37 serves to house the electronics of the preferred embodiment of the present invention. The electronics disposed within electronic housing 37 serve to generate a timing signal of a preselected duration, which is sufficient to meet the requirements of the perception and reaction times of average motorists.

The signal operates to electrically actuate the brake light system of the vehicle, or a light which is disposed at the rear of the vehicle and dedicated for the purpose of providing warning flashes. FIG. 2b is a cross-section of the rear window of vehicle 13 with dedicated electric lamp 39 disposed adjacent glass window 41. Dedicated electric lamp 39 can be any conventional lamp, including the supplemental eye-level brake lights now required by federal law.

Figure 4:
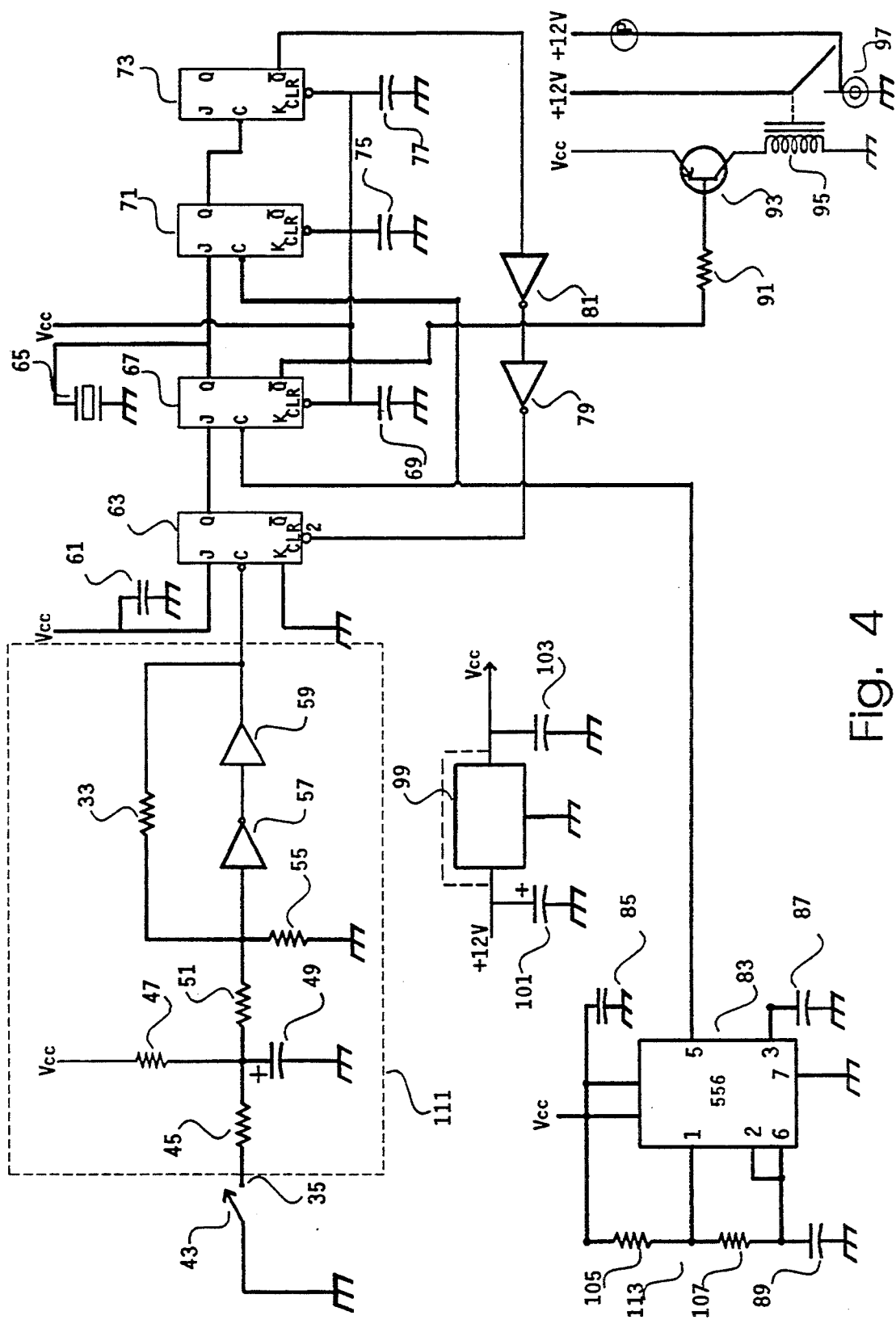
FIG. 4 is an electrical schematic of the preferred embodiment of the warning light system of the present invention.

Turning now to FIG. 4, the preferred embodiment of the electronics of the warning light system of the present invention will now be described. Switch 43 corresponds to actuator button 33 of FIG. 2a, and is disposed within the cab region of the vehicle. Switch 43 is electrically coupled through electrical conductor 35 to debounce circuit 111. Debounce circuit 111 is provided to ensure that only a single signal is provided from switch 43, and that the signal presented to the remainder of the circuit is clean.

Debounce circuit 111 includes pull-up resistor 45, which is connected between resistor 47 and capacitor 49. Voltage VCC is applied to the series connection of resistor 47 and capacitor 49, and serves to charge capacitor 49 to some fraction of the total voltage VCC in an amount which is determined by the voltage divider established by resistors 47, 51, and 55. Therefore, a voltage level is applied to the input of series connected inverters 57, 59. Inverters 57, 59 are provided to provide a small time delay.

In operation, when switch 43 is closed, capacitor 49 is connected to ground through resistor 45. Capacitor 49 discharges, changing the input to inverters 57, 59, from a high voltage to a low voltage.

The output of debounce circuit 111 is connected to the clock input of JK flipflop 63. The K input of JK flipflop 63 is connected to ground. Output Q of JK flipflop 63 is connected to the J input of JK flipflop 67. The K input of JK flipflop 67 is left floating. The Q output of JK flipflop 67 is connected to the J input of JK flipflop 71 and crystal oscillator 65. The K input of JK flipflop 71 is left floating. The Q output of JK flipflop 71 is connected to the clock input of JK flipflop 73. The Q-not output of JK flipflop 73 is connected to the clear input of JK flipflop 63. The clear inputs of JK flipflops 67, 71, 73 are connected to VCC (the 5 volt output of the voltage regulator circuit). Capacitor 69, 75, 77 serve to provide radio frequency and noise immunity to the flipflops.

The clock inputs of JK flipflops 67, 71 are connected to timing circuit 113. Timing circuit 113 includes an monostable multi-vibrator 83 which produces a series of output pulses having a frequency set by resistors 105, 107 and capacitor 89. The various pin designations for monostable multi-vibrator 83 are provided in FIG. 4. Capacitors 85, 87 are provided as required by the specifications of the particular monostable vibrator selected to ensure noise and RF immunity. The output of monostable multi-vibrator 83 is selected to provide a pulse train, with each negative going pulse having a duration in an amount corresponding to the length of the desired warning flash. For example, it may be determined that an appropriate warning flash duration be 0.1 seconds. In that event, the output of monostable multi-vibrator 83 will include a pulse train with pulses having a duration of 0.1 seconds each. The duration between the negative going transitions of pulses constitutes the off-time of the electrically actuated lamp. As stated above, the output of monostable multi-vibrator 83 is provided to the clock inputs of JK flipflops 67, 71.

In operation, when switch 43 is closed, the clock input of JK flipflop 63 goes from high to low. Upon this transition, JK flipflop 63 checks the voltage at J input to determine if it is high or low. Of course, J input of JK flipflop 63 is biased high. The Q output of JK flipflop 63 will assume the digital voltage high or low sensed at J input of JK flipflop 63. Therefore, upon actuation of switch 43, output Q of JK flipflop 63 goes from low to high. The high Q output of JK flipflop 63 is applied to both the J input of JK flipflop 67. As is well known, JK flipflops operate a number of ways depending upon the voltage values supplied at the various pin. If J and K are tied high, or if K floats and J is high, the Q and Q-not outputs will change state upon receipt of every negative-going transition. In the configuration of FIG. 4, JK flipflop 63 enables JK flipflop 67 to flipflop on every pulse received from monostable multivibrator 83. Flipflops 71 and 73 operate to limit flipflop 73's ability to respond to no more than two clock pulses. This ensures that only two flashes will be provided. Of course, any additional number of circuit elements can be provided to allow for a greater number of flashes.

The Q-not output of JK flipflop 67 is applied through resistor 91 to the base of switching transistor 93. When zero voltage is applied to the base of transistor 93, transistor 93 conducts, causing current to flow from VCC to ground, through the electromagnetic coil of relay 95, causing the relay switch to close, connecting 12 volts to electrically actuated lamp 97, which may be one or more bulbs in the vehicle brake system.

The switch of relay 95 is held closed only for as long as the duration of a pulse from the pulse train provided from monostable multi-vibrator 83. Therefore, the electrically actuated light 97 is flashed only for a period of time equivalent in duration to the duration of the pulse from monostable multi-vibrator 83.

Simultaneous with this flash, the logic one of the Q output of JK flipflop 67 is applied to both the J input of JK flipflop 71 and crystal oscillator 65. Crystal oscillator 65 serves to generate a tone to indicate to the vehicle operator that the flash system has been actuated. The clock input of JK flipflop is clocked with the same timing pulse provided from monostable multi-vibrator 83, which actuates switching transistor 93 to cause the first flash from electrically actuated lamp 97.

JK flipflops 71, 73 operate together as a divide-by-two and hold circuit. The next timing pulse causes the digital one which is applied to input J of JK flipflop 71 to be passed to output Q of JK flipflop 71. Output Q of JK flipflop 71 is applied to the clock input of JK flipflop 73, causing the Q-not output of JK flipflop 73 to go low. This output of JK flipflop 73 is applied, through inverters 79, 81 (which are provided for an appropriate time delay of seconds), to the clear input of JK flipflop 63. When a digital zero is applied to the clear input of JK flipflop 63, the Q output of JK flipflop 63 goes low, causing the Q output of JK flipflop 71 to go low, and causing the Q-not output of JK flipflop 67 to go high. When Q-not of JK flipflop 67 goes high, switching transistor 93 is disabled, and current ceases flowing through relay 95.

The net result of this circuitry is that the system is allowed to only provide two sequential flashes before being disabled by application of zero voltage to the clock input of JK flipflop 63. With each flash, crystal oscillator 65 produces a tone for the benefit of the vehicle operator. This tone serves a purpose, namely to provide some kind of psychological feedback to the vehicle operator so that he or she knows that the rearward motorists have been warned to slow down.

It should be apparent to one of average skill in the art that the present invention can be adapted to provide a plurality of flashes of any selected number. This would be accomplished by providing additional JK flipflops in sequence so that a number of timing pulses are allowed before the series of JK flipflops are rendered insensitive to subsequent timing pulses by application of a digital zero to selected clock inputs.

In the present invention, actuation of switch 43 propagates a digital one through the first gate. The next timing pulse which is received at the clock input of JK flipflop 67 serves to simultaneously provide the first flash, and a digital one to the input of JK flipflop 71. The second timing pulse received serves to simultaneously energize the electrically actuated lamp to provide a second flash, and to apply a digital one to the clock input of JK flipflop 73. In turn, JK flipflop 73 serves to apply a digital zero to the clock input of JK flipflop 63, thus disabling the system to providing further warning flashes.

Figure 3:
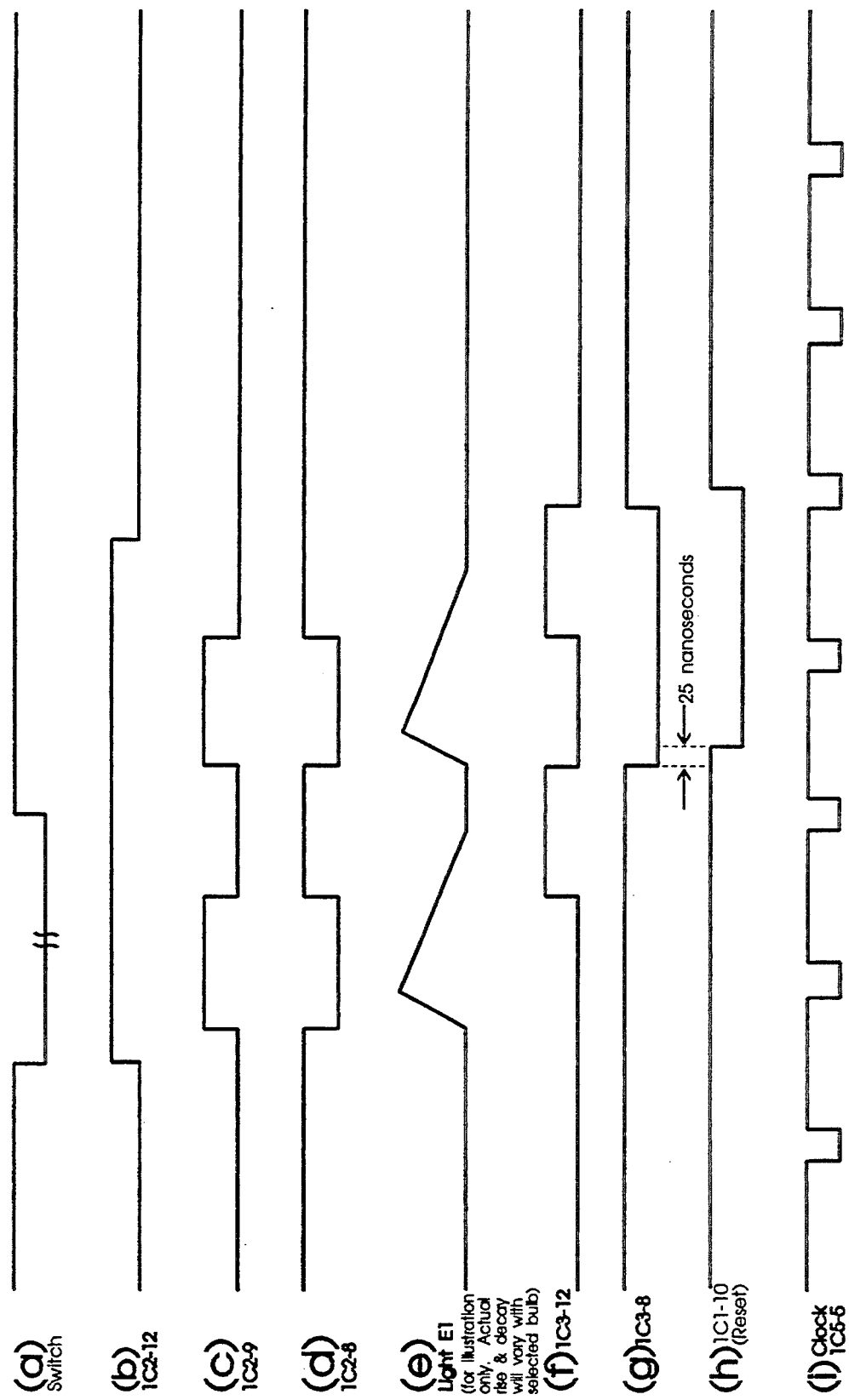
FIG. 3 is a graph which depicts the electrical signals of the warning light system of the present invention in contrast with a vehicle hazard light flash.

FIG. 3 is a graphic depiction of various electrical signals generated by the preferred embodiment of the present invention. These signals are aligned on a common time axis, and represent the electrical signals at various locations within the circuit. FIG. 3*i* depicts the signal at switch 43. FIG. 3*a* depicts the output of monostable multivibrator 83 which serves to clock JK flipflops 67, 71. FIG. 3*b* depicts the signal at the Q output of JK flipflop 63 in response to actuation of switch 43. FIG. 3*c* depicts the Q output of JK flipflop 67 in response to two clock pulses received from monostable multi-vibrator 83. FIG. 3*d* depicts the Q-not output of monostable multi-vibrator 67 in response to two clock pulses received from monostable multi-vibrator 83. The Q-not output of JK flipflop 67 actuates switching for the vehicle brake lights. The electrical signal which actuates the vehicle brake lights is graphically depicted in simplified form in FIG. 3*e*. FIG. 3*f* is a depiction of the Q output of JK flipflop 71, while FIG. 3*g* depicts the Q-not output of JK flipflop 73. FIG. 3*h* depicts the output signal of the Q-not output JK flipflop 73 after it is routed through inverters 79, 81, which provide a twenty-five nanosecond delay.

Figure 9:
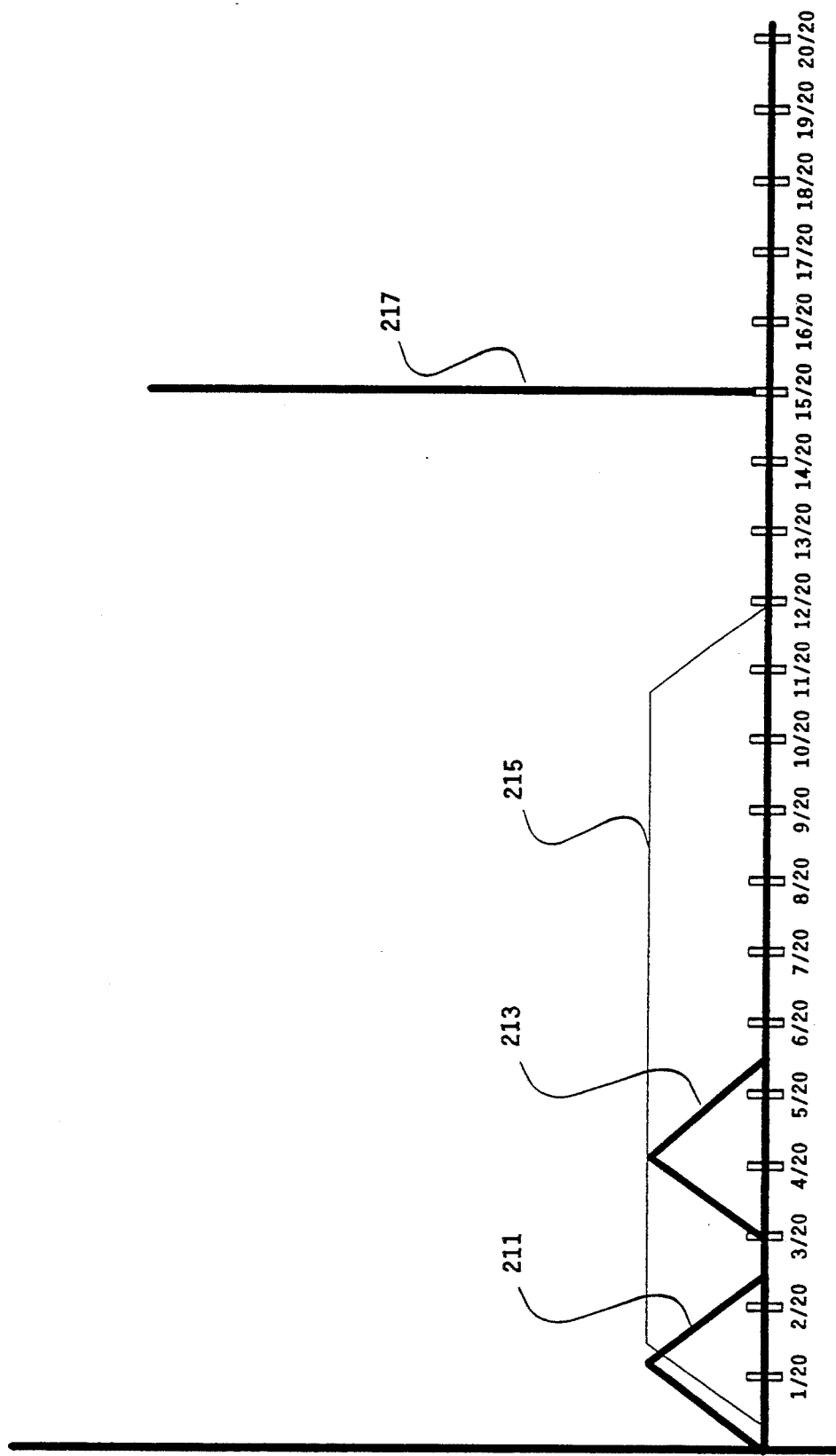
FIG. 9 is a simplified depiction of the warning flashes produced with the present invention in contrast with an average hazard light signal.

In FIG. 9, the flash is produced with the preferred embodiment of the present invention are depicted in graphic form against an X-axis which represents time in seconds. Line 217 represents the average braking response time for drivers, as set forth in the *Texas Driver's Handbook*, which is published by the Texas Department of Human Services (revised edition 1990, see page 8-1). Flash 215 is representative of an average hazard light flash. Experiments were performed to determine the average duration of a hazard light flash by sampling data from a number of late-modeled automobiles. On average, from the group sampled, the hazard light flash has a duration of approximately 12/20ths of one second. In FIG. 9, the warning flashes 211, 213 of the present invention are depicted in graphic form. Preferably, both flash pulses are completed in 6/20ths of one second, an amount far shorter in duration than the hazard light flash, and significantly shorter than the average response time 217 of drivers. FIG. 9 graphically depicts how flashes 211, 213 are selected in duration so that they cannot be confused with hazard light flashes, and are well within the braking response time of the average driver.

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications or embodiments that fall within the true scope of the invention.

What is claimed is:

1. A warning light system for use in a motor vehicle, said vehicle having a cab region for accommodating a vehicle driver, and a brake light system including a brake pedal which selectively electrically couples a voltage source and an electrically actuated lamp disposed at the rear of said vehicle in response to actuation of said brake pedal said warning light system, for providing a warning signal to motorists rearward of said vehicle, said motorists having on average a reaction time above a reaction time threshold, comprising:

a timer means for producing a train of timing pulses, said train of timing pulses altogether having a duration less than said reaction time threshold;
   actuator means disposed within said vehicle cab region and electrically coupled to said timer means operable by said vehicle driver independently of said brake pedal for actuating said timer means;
   a lamp switch electrically coupled between said voltage source and said electrically actuated lamp of said brake light system responsive to said timer means for coupling said voltage source to said electrically actuated lamp, completing an electrical circuit, and causing said electrically actuated lamp to be energized and flashed in a pattern corresponding to said timing pulses of said timer means;
   wherein said motorists rearward of said vehicle are exposed to a train of flashes of said electrically actuated lamp of said vehicle brake light system, which altogether have a duration less than said reaction time threshold.

2. A warning light system according to claim 1, wherein said timer means includes inhibitor means for rendering said timer means unresponsive to said actuator means for a predetermined refractory period of time after actuation to prevent the extension of timing pulses beyond said reaction time threshold.

3. A warning light system for use in a motor vehicle, said vehicle having a cab region for accommodating a vehicle driver and a brake light System including a brake pedal which selectively electrically couples a voltage source and an electrically actuated brake lamp disposed at the rear of said vehicle in response to actuation of said brake pedal said warming light system, for providing a warning signal to motorists rearward of said vehicle, said motorists having on average a reaction time above a reaction time threshold, comprising:

a timer means for producing a train of timing pulses, said train of timing pulses altogether having a duration less than said reaction time threshold;
   actuator means disposed within said vehicle cab region and electrically coupled to said timer means operable by said vehicle driver independently of said brake pedal for actuating said timer means;
   an electrically actuated lamp mounted rearward on said vehicle;
   a lamp switch electrically coupled between said voltage source and said electrically actuated lamp responsive to said timer means for coupling said voltage source to said electrically actuated lamp, completing an electrical circuit, causing said lamp to be energized and flashed in a pattern corresponding to said train of timing pulses of said timer means;
   wherein said motorists rearward of said vehicle are exposed to a train of flashes of said electrically actuated lamp, which altogether have a duration less than said reaction time threshold.

4. A warning light system according to claim 3, wherein said timer means includes inhibitor means for rendering said timer means unresponsive to said actuator means for a predetermined refractory period of time after actuation to prevent the extension of timing pulses beyond said reaction time threshold.

5. A method of warning motorists disposed rearward of a vehicle, said vehicle having a cab region for accommodating a vehicle driver and a brake light system including a brake pedal which selectively electrically couples a voltage source and an electrically actuated brake lamp disposed at the rear of said vehicle in response to actuation of said brake pedal, said motorists having on average a reaction time above a reaction time threshold, comprising:

providing an electrically actuated lamp;
   coupling said electrically actuated lamp at the rear of said vehicle;
   providing a lamp switch electrically coupled between said electrically actuated lamp and said electrical power source, which is operable independently of said brake pedal and which is responsive to an actuating pulse train;
   producing an actuating pulse train composed of a plurality of pulses, each pulse having a duration less than said reaction time threshold, and said pulse train altogether having a duration time less than said reaction time threshold; and
   activating said lamp switch without simultaneous actuation of said brake pedal and thereby selectively applying said actuating pulse train to said lamp switch to energize said electrically actuated lamp in a pattern corresponding to said actuating pulse train but for a duration which is altogether less than said reaction time threshold.

6. A method of warning according to claim 5, further comprising:

disabling said lamp switch for a selected refractory period after receipt of a pulse train to prevent actuation of said electrically actuated lamp beyond said reaction time threshold.

7. A method of warning according to claim 5, further comprising providing an indication signal within said vehicle corresponding to energization of said electrically actuated lamp.

8. A warning light system for use in a motor vehicle having a cab region for accommodating a vehicle driver, and a brake light system including a voltage source and an electrically actuated lamp disposed at the rear of said vehicle, for providing a warning signal to motorists rearward of said vehicle, said motorists having on average a reaction time above a reaction time threshold, comprising:

a timer means for producing at least one timing pulse, each of said at least one timing pulse having a duration less than said reaction time threshold;

actuator means disposed within said vehicle cab region and electrically coupled to said timer means operable by said vehicle driver for actuating said timer means;

a lamp switch electrically coupled between said voltage source and said electrically actuated lamp of said brake light system responsive to said timer means for coupling said voltage source to said electrically actuated lamp, completing an electrical circuit, and causing said electrically actuated lamp to be energized and flashed in a pattern corresponding to said at least one timing pulse of said timer means;

wherein said motorists rearward of said vehicle are exposed to at least one flash of said electrically actuated lamp of said vehicle brake light system, each of said at least one flash having a duration less than said reaction time threshold; and wherein said timer means includes inhibitor means for rendering said timer means unresponsive to said actuator means for a predetermined refractory period of time after actuation to prevent the extension of timing pulses beyond said reaction time threshold.

9. A warning light system for use in a motor vehicle having a cab region for accommodating a vehicle driver, for providing a warning signal to motorists rearward of said vehicle, said motorists having on average a reaction time above a reaction time threshold, comprising:

a timer means for producing at least one timing pulse, each of said at least one timing pulse having a duration less than said reaction time threshold;

actuator means disposed within said vehicle cab region and electrically coupled to said tinner means operable by said vehicle driver for actuating said timer means;

an electrically actuated lamp mounted rearward on said vehicle;

a voltage source carried by said vehicle;

a lamp switch electrically coupled between said voltage source and said electrically actuated lamp responsive to said timer means for coupling said voltage source to sad electrically actuated lamp, completing an electrical circuit, causing said lamp to be energized and flashed in a pattern corresponding to said at least one timing pulse of said timer means;

wherein said motorists rearward of said vehicle are exposed to at least one flash of said electrically actuated lamp, each of said at least one flash having a duration less than said reaction time threshold; and wherein said timer means includes inhibitor means for rendering said timer means unresponsive to said actuator means for a predetermined refractory period of time after actuation to prevent the extension of timing pulses beyond said reaction time threshold.

10. A method of warning motorists disposed rearward of a vehicle, said motorists having on average a reaction time above a reaction time threshold, comprising:

providing an electrically actuating lamp, and an electrical power source;

coupling said electrically actuated lamp at the rear of said vehicle;

providing a lamp switch electrically coupled between said electrically actuated lamp and said electrical power source which is responsive to an actuating pulse train;

producing an actuating pulse train composed of a plurality of pulses, each pulse having a duration less than said reaction time threshold, and said pulse train altogether having a duration time less than said reaction time threshold;

selectively applying said actuating pulse train to said lamp switch to energize said electrically actuated lamp in a pattern corresponding to said actuating pulse train; and disabling said lamp switch for a selected refractory period after receipt of a pulse train to prevent actuation of said electrically actuated lamp beyond said reaction time threshold.

* * * * *